Patented Sept. 19, 1922.

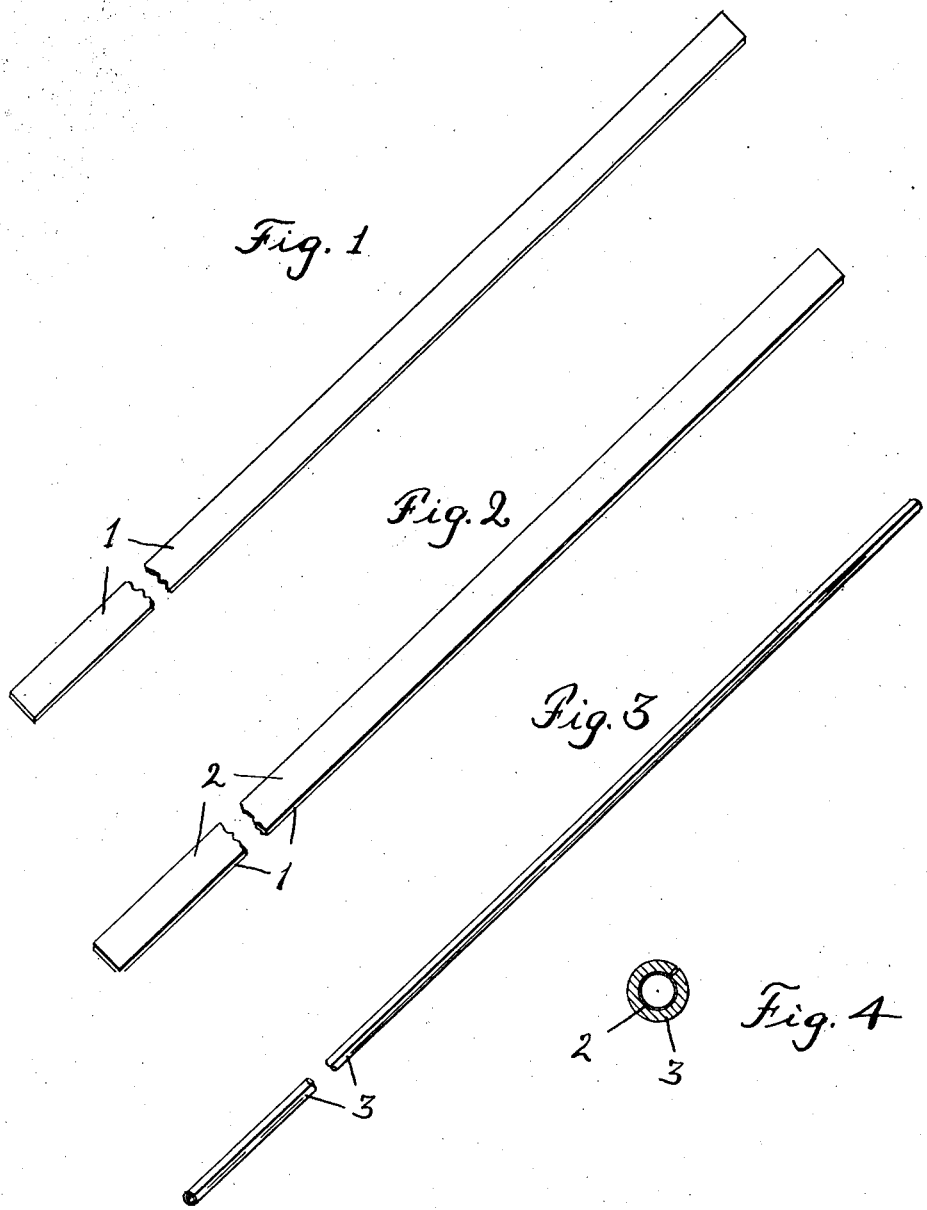

1,429,703

UNITED STATES PATENT OFFICE.

GEORGE L. VAN ALLEN, OF PRINCE BAY, NEW YORK, ASSIGNOR TO BAKER & COMPANY, INC., A CORPORATION OF NEW JERSEY.

FLUXED SOLDER.

Application filed September 21, 1918. Serial No. 255,067.

*To all whom it may concern:*

Be it known that I, GEORGE L. VAN ALLEN, a citizen of the United States, and a resident of Prince Bay, Staten Island, New York, have invented new and useful Improvements in Fluxed Solders, of which the following is a specification.

This invention relates to solder which is sold ready for use, with the proper amount of flux properly distributed upon itself, so that upon melting it will form a perfect joint. I have shown the invention applied to dental solder, but obviously it can be used upon solder for any purpose whatever.

The objects of the invention are to avoid displacement of the flux with respect to the solder, before use in soldering; to nevertheless enable the flux to be evenly and exactly applied, with convenience and rapidity; to provide a fluxed solder in form which is easily handled and which is readily melted, and to obtain other advantages and results as may be brought out in the following description.

Referring to the accompanying drawings, in which like numerals of reference indicate the same parts throughout the several views, Figure 1 is a perspective view of a strip of solder;

Figure 2 shows the same with flux applied to one side surface in accordance with my invention;

Figure 3 is a view of the strip of fluxed solder drawn or rolled into tubular form, and Figure 4 is an enlarged cross-sectional view of the same.

In the specific embodiment of the invention illustrated in said drawings, 1 indicates a strip of dental solder, although it might be solder of any kind whatsoever. I apply the flux to one side surface of the solder strip, as at 2, preferably in liquid form painted or brushed on, as a solution of boracic acid in alcohol, although it might be done otherwise if desired, and then by drawing, rolling or the like I form the strip into a tube 3 with the flux coating 2 inside. In this way, the flux coating is not disturbed or displaced in handling the product and said product is in the form of a hollow rod or pencil which fuses quickly and evenly.

Because of the tubular form of my fluxed solder, each circumferential portion of the solder is supplied with its proper amount of flux and such proper amount of flux is separated from other portion of the solder by an open space. In other words, not only is the solder in the form of a tube, but also the flux is in the form of a tube, inside the solder tube, so that when any end edge portion of the entire hollow rod or pencil fuses, a certain definite amount of flux goes with the solder. Much more accurate and even fluxing is thus obtained than would be possible if the tubular solder was filled with flux, for in that case there would be no determination of the amount of flux which would go with any portion of the walls of the solder tube. That is to say, with a solder tube filled with flux, if a side portion of the solder tube melted away in use, practically all the flux in that longitudinal portion of the tube might go with it, so that there would be practically no flux left for the opposite unmelted portion of the solder tube when that should be melted. In other words, there is no way of determining that the solid column of flux would separate at its central axial line and a given portion radially outward from said center move or flow only radially outward in use, but by my improved construction of tubular flux, as well as tubular solder, exactly the right proportion of flux can be given the product for the amount and kind of solder used in making it, and as the flux is properly distributed upon the solder in intimate relation thereto a perfect joint will be secured.

It will be understood that my improved product could be made in tubes of other cross-sectional shapes than round, or even folded or rolled up transversely. Preferably, however, different longitudinal portions of the flux coating are spaced from each other transversely of the strip, or separated by an open space or cavity, so that each portion of the solder sheet gets its proper proportion of flux as it melts. Furthermore, the coating of flux is preferably upon the inner wall or walls of the space or cavity, so as to be protected in handling the product. Various modifications may be made in the manufacture of my fluxed solder without departing from the spirit and scope of the invention, and I do not wish to be understood as restricting myself except as required by the following claims when construed in the light of the prior art.

Having thus described the invention, what I claim is:

1. As an article of manufacture, a tube of solder having a coating of flux on the walls thereof.

2. As an article of manufacture, a tube having walls of solder and a coating of flux on the inner wall of said tube of solder.

3. Tubular fluxed solder consisting of solder in tubular form and a tubular layer of flux on said solder.

4. Tubular fluxed solder consisting of solder in tubular form and a tubular layer of flux on the inner wall of said solder.

5. Fluxed solder consisting of a tube of solder and a layer of flux on the inner wall of a thickness less than the radius of the bore of the tube.

6. A solder pencil having walls composed of fluxed sheet solder arranged in opposed spaced relation.

7. A solder pencil composed of a solder body portion having a longitudinal cavity with a coating of flux therein.

8. A solder pencil having a solder body portion with a longitudinal inner wall having a coating of flux thereon.

9. A solder pencil composed of fluxed sheet solder having a portion returned on itself in spaced relation with the flux innermost.

GEORGE L. VAN ALLEN.